United States Patent [19]

Bramer

[11] Patent Number: 4,461,190
[45] Date of Patent: Jul. 24, 1984

[54] GEAR OPERATED REMOTE CONTROL MIRROR AND OPERATIVE CONTROL

[75] Inventor: Walter C. Bramer, Norton Shores, Mich.

[73] Assignee: Lacks Industries, Inc., Grand Rapids, Mich.

[21] Appl. No.: 325,985

[22] Filed: Nov. 30, 1981

[51] Int. Cl.³ .............................................. F16C 1/10
[52] U.S. Cl. ............................................... 74/501 M
[58] Field of Search ................ 74/501 R, 501 M, 479

[56] References Cited

U.S. PATENT DOCUMENTS

| | | | |
|---|---|---|---|
| Re. 27,172 | 9/1971 | Van Noord | 74/501 M |
| 2,315,260 | 3/1943 | Lancaster | 74/479 |
| 3,251,238 | 5/1966 | Fuqua | 74/501 R |
| 3,390,588 | 7/1968 | Savage | 74/501 R |
| 3,411,372 | 11/1968 | Skillin | 74/501 M |

Primary Examiner—Kenneth Dorner
Attorney, Agent, or Firm—Dale A. Winnie

[57] ABSTRACT

A remote control rear view mirror which includes; a mirror member and a mirror supporting member of molded plastic and each mounted on transversely disposed trunnion supports in a housing member, a gear member provided on the mirror supporting member and engaged with a gear segment provided on the mirror member, single cable means operative of the gear member for turning it and axially moving it to change the viewing angle of the mirror member, and a control mechanism for effecting axial and rotational movement of the gear member via the cable means with only rotational movement at the control.

9 Claims, 9 Drawing Figures

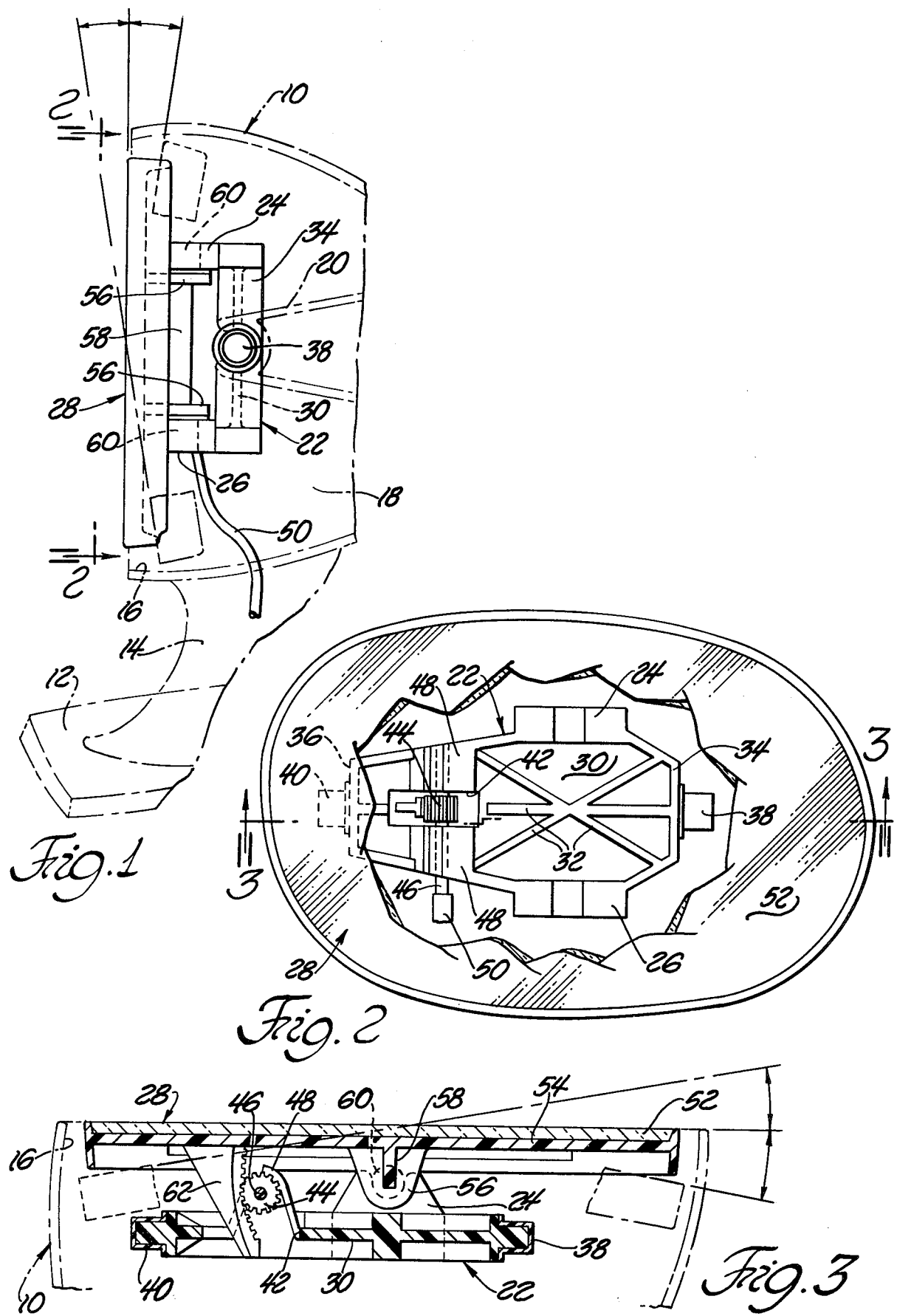

GEAR OPERATED REMOTE CONTROL MIRROR AND OPERATIVE CONTROL

BACKGROUND OF THE INVENTION

Remote control rear view mirrors are commonly known and accepted for use on automotive vehicles.

Most such remote control mirrors include a rear view mirror assembly that is mounted externally on a vehicle door or fender panel and has a control means which is mounted within the vehicle, on the door or instrument panel, and has a flexible wire connection between the control means and the mirror assembly to obtain the desired adjustments of the rear view mirror itself.

Usually, the mirror assembly includes die cast parts with some form of ball and socket or other universal joint connection that provides pivotal support for the rearward viewing mirror. The flexible wire connection is of two or three strands of wire to obtain different relative movement by operation of different combinations thereof and the control means is a pivotal lever which is moved in one direction or another to obtain the mirror adjustments desired through the connecting wire strands.

A certain degree of tightness in the universal joint connection is necessary for stability, but at the same time, there must be sufficient looseness for fingertip adjustment through the cable means. And, while multiple wire controls have been considered to offer better mirror head control, there is the disadvantage of more time, care and effort in making the different wire connections and adjusting them. And, there is also a difference and disadvantage in using a multiple wire cable for the control means since a shorter, longer or different cable route can cause a relative lengthening or shortening of one or more of the cable strands and require special attention, adjustment and setting at the mirror head or control means.

What appears to be needed is a new and different remote control rear view mirror assembly where the parts and pieces are less expensive to manufacture and assemble and where the control means and cable or other connection are more simplified and easier to use.

By having the mirror housing and mirror head parts made of molded plastic, rather than being die cast, there will be an appreciable savings in material cost. And, if the various members of the mirror head assembly are made so that they can be snap-fitted and retained together, there will be a still further advantage in eliminating the time and expense of separate machining operations as when threaded fastener means are required to be used.

In the use of plastic there is also a weight loss advantage that is important as regards over-all vehicle weight loss in fuel economy considerations, that are presently receiving much attention.

A single wire control cable would offer many advantages, beginning with the fact that this type of cable is commonly known and readily available at low cost for many other uses. It would be important, however, that the cable, or other means, be able to obtain a dual function, as by axial and rotational movement, to perform the viewing adjustments required at the mirror head.

And lastly, the control means used with the single wire control should be such as will afford positive and precise control of the mirror head and provide for good incremental control in any and all settings selected.

SUMMARY OF THE PRESENT INVENTION

This invention relates to remote control rear view mirrors and the control mechanisms therefor and, more particularly, to a gear operated remote control rear view mirror for passenger car use which is made principally of molded plastic parts and has a simplified one-cable control system.

The mirror assembly includes a molded plastic housing with a trunnion support provided in the plastic molding, a mirror supporting member, also of plastic, which is journalled and snap fitted into engagement with the trunnion support means in the housing part, and with a mirror member fitted and engaged to a trunnion support provided on the mirror supporting member.

The trunnion supports in the housing and on the mirror supporting member are oppositely or transversely disposed to accommodate and enable universal movement and adjustment of the viewing angle of the mirror member.

The control system includes a single operating cable in a protective sheath which are together operative of a gear member mounted on the mirror supporting member and engaged with a gear segment provided on the back of the mirror member that is being adjusted.

More precisely, the control means includes a first and second control member, at the control end, each of which are rotatable, independently of each other, and one of which is operative of an intermediate part and causes it to be axially reciprocated, in and out, in the course of the rotational movement of the control member. The control cable transmits rotational movement to the gear member and, by having its protective sheath connected to the reciprocal part, the effective length of the cable is extended and foreshortened and thereby effects lateral movement of the gear member and, in turn, pivotal movement of the mirror supporting member on which the gear member is mounted.

The mirror structure, in outwardly appearance, is quite ordinary. However, in assembly the gear member is snap-fitted into engagement with its supports on the mirror supporting member and the latter is snap-fitted into engagement with the mirror member and with the gear member engaging the gear segment. Then the control wire is operatively connected to the gear member and this assembly is snap-fitted into engagement with the trunnion supports in the mirror housing.

The control end is preassembled to the cable and protective sheath with an appropriate escutcheon that is fitted and fastened to the vehicle instrument or door panel.

Other innovations and improvement features will be discussed in the description which follows and which pertains to the drawing figures that are appended hereto.

IN THE DRAWING FIGURES

FIG. 1 is a side plan view of the mirror supporting structure of the present invention with the mirror housing shown in phantom outline.

FIG. 2 is a front view of the mirror member as seen in the plane of line 2—2 in the first drawing figure, looking in the direction of the arrows, and with the center section broken away to show the mirror supporting member therebehind.

FIG. 3 is a cross-sectional view of the mirror supporting structure as seen in the plane of line 3—3 in the previous drawing figure, looking in the direction of the arrows, and with the mirror housing opening and relative movement of the mirror member shown in phantom outline.

DESCRIPTION OF THE ILLUSTRATED EMBODIMENT

Figure 4:
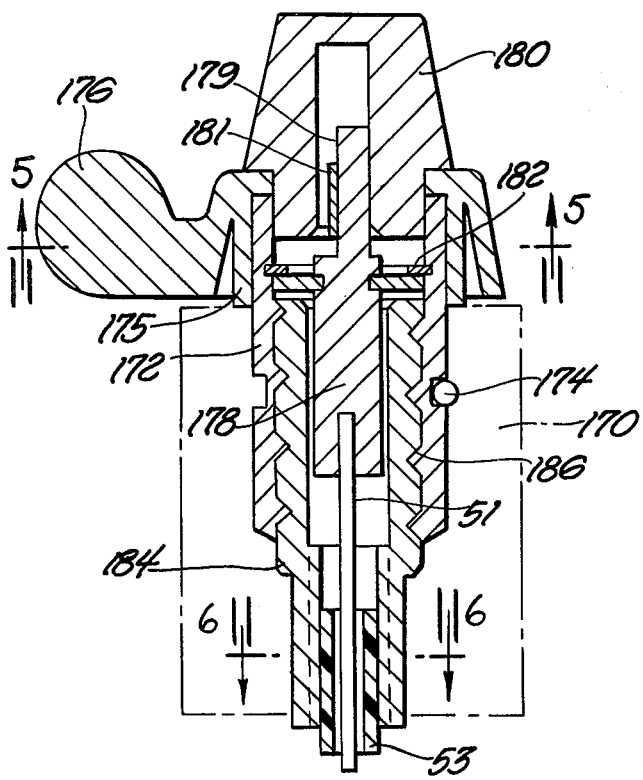
FIG. 4 is a cross-sectional view of the control for the mirror, with the escutcheon for mounting it in a vehicle instrument or door panel shown in phantom outline.

The mirror housing 10 which is shown in phantom outline in the first drawing figure is made of molded plastic and includes a base 12 and a stem or arm 14 which are intended to be secured to an outer vehicle door or fender panel to dispose the mirror in the housing for rearward viewing from within the vehicle on which provided.

The mirror housing is formed to include a rearwardly disposed opening 16 and to have sufficient space 18 therewithin to receive and house the mirror and its supporting structure and to allow for their relative movement. The housing may also be aerodynamically shaped, tapering forwardly, as is commonly known, for reduced wind resistance and added protection of the mirror assembly against adverse wind effects.

A pair of relatively spread arms 20 are formed and provided in the housing part to afford a first trunnion support within which is received and supported a mirror supporting member 22. And, the mirror supporting member is in turn formed to provide a pair of projections or spaced arms 24 and 26 that serve as a second trunnion support to receive and hold the mirror member 28 in the housing opening 16.

As shown in FIGS. 2 and 3, the mirror supporting member 22 is a molded plastic part which includes a body wall 30 with strengthening ribs 32 and end walls 34 and 36 on which are provided pivot pins 38 and 40, respectively.

The pivot pins 38 and 40 on the mirror supporting member are received and journalled in the trunnion supports 20 within the mirror housing 10 so that the mirror supporting member 22 is pivoted about a horizontal axis, as viewed in the drawing figures.

Looking closer at the mirror supporting member 22, it will be noted that there is an opening 42 through the body wall 30, near the pivot pin 40, and that there is a gear member 44 in this opening. Further, the gear member is on a through shaft 46 which has its ends journalled in molded projections 48 standing out from the body wall on each side of the opening 42. And, although not readily apparent from the drawing figures, it is to be appreciated that the shaft ends are snap-fitted into engagement in their respective journal bearing supports and that one end of the shaft extends sufficiently beyond the member part 22 for operative engagement by the control cable part 50.

As shown in FIGS. 1 and 3, the mirror member 28 includes the mirror glass 52 within a holder part 54 of molded plastic and which is formed to include a pair of rearwardly disposed and relatively spaced arms 56, with a strengthening wall or rib 58 therebetween, and with a pivot pin 60 on each thereof that is received and journalled in the trunnion supports 24 and 26 on the mirror supporting member 22 just described.

FIG. 3 also shows a rearwardly disposed projection 62 on the back of the mirror member 28 which is formed to include a gear segment with teeth that mate and match those of the gear member 44 on the mirror supporting member. And, it will be noted in assembly that the gear segment part 62 is engaged with the gear member 44 from the outer side, to hold the gear shaft 46 locked in its journal supports when the pivot pins 60 are snap-fitted into the trunnion supports 24 and 26 of the mirror supporting member. And the two mirror holding parts 22 and 28 are subsequently assembled, together, in the housing 10 by having the pivot pins 38 and 40 on the mirror supporting member snap-fitted into engagement within the trunnion support provided by the arms 20 in the housing part.

Figure 9:
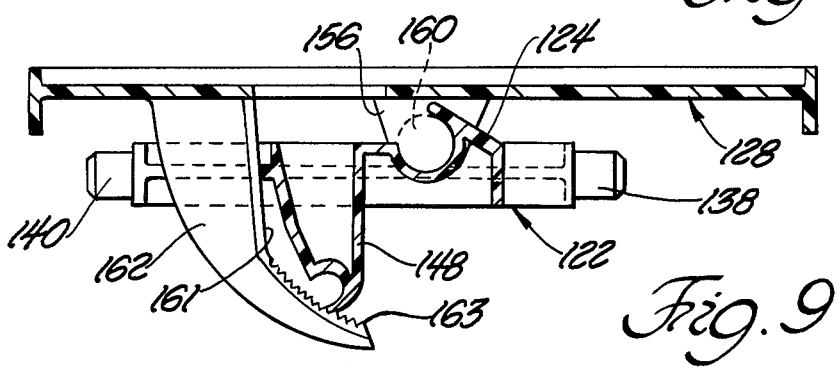
FIG. 9 is a cross-sectional view of the supporting member shown in the previous drawing figure with a companion mirror member, to show another arrangement which has certain advantages that will be discussed hereinafter.

A similar but different form of the two mirror holding and adjusting parts 22 and 28 are shown in FIGS. 9 and 10 and are identified as 122 and 128, respectively. Like features are identified by like numbers with a prefix designation placing them in the one hundred series; such as 138 and 140 for the pivot pins on the ends of the mirror supporting member 122, to avoid the necessity for redescribing structure that is relatively apparent from what has been heretofor said.

The principal difference of note in the arrangements of the mirror holding and adjusting parts 122 and 128 is that the trunnion supports 148 for the gear member (not shown) are on the back side of the mirror supporting member part 122, rather than on the same side as the bearing supports 124 and 126. Also they are on one side, rather than centrally disposed and one side of the base wall 130 is cut away, as at 143, to provide access for the gear segment 162, much like the opening 42 in the part 22.

Figure 8:
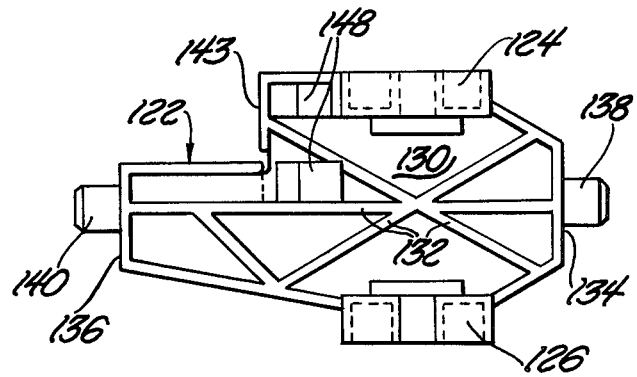
FIG. 8 is an elevational view of another form of the mirror supporting member, which will be subsequently described in greater detail.

The gear segment 162 is formed to provide a back wall stop 161 and an end stop 163 to limit travel of the gear member part thereover. Also, as better seen in FIG. 8, there is a groove 165 down the middle of the gear segment, and an O-ring 167 on the drive gear 144, whereby a smoother positive drive is obtained with the gear teeth serving as fixed locators against drive slippage and such.

In further discussions of the control means for operating the disclosed mirrors, it will be appreciated that the control cable part 50 is actually a single braided or wound wire cable 51 within a sheath 53. The cable part is connected to the shafts 46 and 146 and is rotatably operative of the drive gears 44 and 144, respectively. And the end of the sheath 53 is relatively fixed within the mirror housing or elsewhere so that when the cable part is caused to be extended or retracted it will act on the mirror supporting member 22 and cause it to be pivotally moved in the mirror housing on the pivot pins 38, 40 for the one mirror arrangement and/or 138, 140 for the other mirror supporting arrangement.

In this latter respect, it will be noted that the mirror supporting arrangement of FIG. 9 has the gear member disposed a further distance out from the pivotal axis provided by pivot pins 138, 140 and that consequently more finite control is obtained in the pivotal movement afforded by axial extension and retraction of the cable 51 within its protective sheath. This also provides greater resistance against vibrational flutter by reason of the greater radial distance afforded out from the pivotal axis.

Referring now to FIG. 4, the control means for the disclosed mirror is shown to include an assembly that can be mounted on a vehicle door panel or instrument panel and which comprises an escutcheon 170 that is received in an opening in a door or instrument panel and which has a cylindrical part 172 received therewithin and keyed thereto, as by snap-ring 174, for rotational movement and against relative axial movement. This cylindrical part, as will later be shown, is one of the operative controls.

Centrally within and extending through both the escutcheon 170 and the cylindrical control part 172 is a shaft 178, with a knob 180 on its outer end, and with the control cable 51 fastened thereto at its inner disposed end.

The shaft 178 has an external snap-ring connection 182 with the cylindrical part 172 and includes a cylindrical member axially moveable on it and 184 with a three lead Acme type thread engagement, as at 186, with the cylindrical part 72. The lower end of part 84 is flattened on one side, as at 88, and cooperates with a like opening 90 in the inner end of the escutcheon part 70.

The control cable sheath 53 is, in turn, connected to the end of the threaded part 184 so that axial movement of part 178, causes the cable 51 to be relatively extended and retracted therewithin at the other end.

When knob 180 is turned cable 51 is turned, and the gear 44 or 144 is caused to turn, acting on the gear segment 62 or 162 and the mirror is pivoted on pins 60 or 160.

When the cylindrical part 172 is turned, its thread engagement with part 184 causes the latter to be moved axially and to act on the cable sheath 53 to effect relative movement of the cable 51 at the other end and to act on or against the pinion gear 44 or 144 which in turn causes the mirror supporting part 22, and the mirror member 28, to be pivoted on the pins 38, 40 or 138,140.

The control knob 180 receives the upper end of shaft 178 therewithin and the shaft has a flatted side, as at 179, which is trapped by the key plate 181 across the hole so that the two will turn together.

Figure 5:
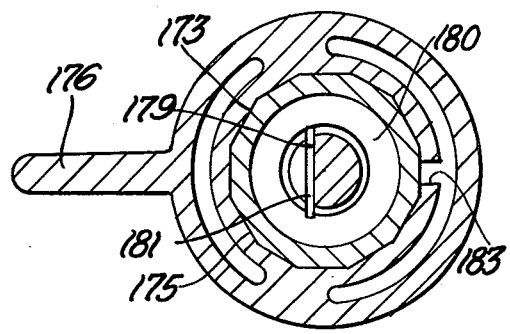
FIG. 5 is a cross-sectional view of the control member as seen in the plane of line 5—5 in the previous drawing figure and looking in the direction of the arrows.

The other pivotal control, provided by turning part 172 to effect axial movement of part 184, is through the thumb and forefinger extension 176 on a collar part 175 that is formed with the upper end of part 184 to have a multifaceted or polygonal surface 173 therebetween; as best seen in FIG. 5. The thumb tab extension 176 helps distinguish between the two control elements, the other being the center knob 180, and the multifaceted surfaces 173 allows for a ratchet action, by means of slot 183 in part 175, should the mirror be stuck or frozen.

Figure 6:
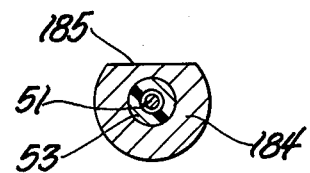
FIG. 6 is an end view of the reciprocal part of the control mechanism to show the flattened side which prevents rotational movement thereof.
Figure 7:
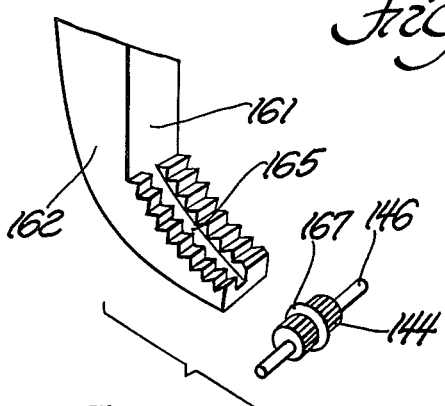
FIG. 7 is a perspective sketch of the gear segment and gear member, which constitute the drive mechanism for the mirror, with a certain improvement feature more clearly seen in this view.

FIG. 6 shows the axially removable part 184 has one side flatted, as at 185, which will be appreciated as keyed in the escutcheon 170 to prevent its turning.

The knob 180 turns cable 51 which acts on the pinion gear in the mirror head. The pinion gear acts on the gear segment and causes the mirror member to be pivotally moved about a vertical axis. The thumb tab control 176 acts through its threaded engagement with part 184 to cause the latter to be axially extended or retracted and to thereby act on the sheath 53 and cause the relative movement of the cable 51 which then acts laterally on the pinion gear and pivots the mirror support and mirror member together about the horizontal adjustment axis for the mirror assembly.

I claim:

1. A remote control rear view mirror, comprising;
a housing having a rearwardly disposed opening provided therein and a trunnion support within said housing for receiving and supporting a mirror member in said opening and providing an adjustment axis therefor,
a mirror supporting member received and supported in said trunnion support and having a trunnion support provided thereon for the mirror member and providing another adjustment axis therefor,
a mirror member engaged in said last mentioned trunnion support and having the viewing angle thereof adjustable in relative movement afforded by said first and second mentioned trunnion supports,
control means operatively engaged to said mirror member and mirror supporting member and including a single wire cable member having a protective sheath provided therearound and means for selectively and individually actuating both said wire cable and said sheath in the operative control and adjustment of said mirror member within said trunnion supports.

2. The remote control rear view mirror of claim 1;
said actuating means providing for rotational movement and control of said wire cable within said sheath and affording axial movement of said sheath about said wire cable to change the relative length of said wire cable at the mirror end and obtain push-pull actuation thereof.

3. The remote control rear view mirror of claim 2;
a pinion gear rotatably mounted on said mirror supporting member and a gear segment provided on said mirror member and engaged with said pinion gear,
and said wire cable being rotatably operative of said pinion gear.

4. The remote control rear view mirror of claim 3;
said sheath having the end thereof that is received in said housing fixedly located for allowing axial movement of said wire cable therethrough and affecting pivotal movement of said mirror supporting member.

5. The remote control rear view mirror of claim 3;
said pinion gear being disposed on the opposite said of said mirror supporting member from the trunnion support thereon and being relatively spaced from both of the adjustment axes afforded by said trunnion supports.

6. The remote control rear view mirror of claim 3;
said gear segment being formed to provide limit stops restrictive of the travel afforded thereto in the adjustment of said mirror member via said pinion gear.

7. The remote control rear view mirror of claim 1;
said actuating means including a first control member mounted for rotation about a given axis and against axial movement in the course thereof, a part mounted within said first control member and for axial movement relative thereto in the course of rotational movement thereof, a second control member mounted within said first control member for rotation about said given axis independently of said first control member and restrained against axial movement in the course thereof, said second control member being connected to said wire cable for effecting rotational movement thereof and said first control member being connected to said sheath for extending and foreshortening the effective length of said control cable and thereby in combination obtaining rotational and axial movement thereof.

8. A remote control mechanism for rear view mirrors and other uses, and comprising:

a housing member capable of being fixedly mounted in a given location and in having other parts and members assembled thereto, a first control member mounted within said housing member for rotational movement about a given axis therethrough and restrained against axial movement relative thereto, a part mounted within said first control member for axial movement relative thereto in the course of the rotational movement thereof, a second control member mounted within said first control member for rotation about said given axis independently of said first control member and restrained against axial movement in the course thereof, and cable means operative of a selected device and including a control cable connected to said second control member and a protective sheath through which said control cable is extended and which is connected to said first control member.

9. The remote control mechanism of claim 8;

said control cable being adapted to transmit the rotational movement afforded by said second control member to operative means at the end thereof, and said sheath having one end thereof fixed and the other end thereof afforded relative axial movement for extending and foreshortening the effective length of said control cable and transmitting axial movement therethrough.

* * * * *